United States Patent
Wippler et al.

(10) Patent No.: US 7,735,785 B2
(45) Date of Patent: Jun. 15, 2010

(54) BRACKET FOR MOUNTING RADIO OR OTHER INSTRUMENT IN AUTOMOTIVE VEHICLE INSTRUMENT PANEL

(75) Inventors: Erik A. Wippler, Canton, MI (US); Kerry Scott Zellner, Jr., Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 384 days.

(21) Appl. No.: 11/773,006

(22) Filed: Jul. 3, 2007

(65) Prior Publication Data
US 2009/0008511 A1    Jan. 8, 2009

(51) Int. Cl.
*G12B 9/00*    (2006.01)
(52) U.S. Cl. ................... 248/27.1; 248/201
(58) Field of Classification Search ............. 248/27.1, 248/27.3, 201, 674, 675; 455/345; 312/223.2; 361/679.37, 679.38, 679.39
See application file for complete search history.

(56) References Cited

U.S. PATENT DOCUMENTS 2,790,961 A * 4/1957 Del Camp .................. 439/554
4,447,030 A    5/1984 Nattel et al.
4,546,850 A * 10/1985 Litner ....................... 181/141
5,104,071 A    4/1992 Kowalski
5,676,338 A   10/1997 Warda et al.
6,371,433 B2 * 4/2002 Anderson et al. ........... 248/562
6,932,310 B1 * 8/2005 Diss .......................... 248/301

FOREIGN PATENT DOCUMENTS

DE    3824301    2/1990

* cited by examiner

*Primary Examiner*—Korie Chan
(74) *Attorney, Agent, or Firm*—Gifford, Krass, Sprinkle, Anderson & Citkowski, P.C.

(57) ABSTRACT

A bracket (20) for attachment to a side of a radio or other multimedia instrument (40) having a leading edge (22) with an outwardly projecting, generally U-shaped rib (23) positioned inwardly of a free end of the leading edge, and/or an in-turned flange (26) positioned away from the leading edge of the bracket and having a tab (27) extending normally from the flange for engagement with the instrument to support and position the instrument during attachment of wiring elements to the instrument.

6 Claims, 4 Drawing Sheets

BRACKET FOR MOUNTING RADIO OR OTHER INSTRUMENT IN AUTOMOTIVE VEHICLE INSTRUMENT PANEL

FIELD OF THE INVENTION

This invention relates to a bracket for attachment to a side of a radio or other multimedia instrument to assist in the insertion of the instrument into an instrument panel of an automotive vehicle.

BACKGROUND OF THE INVENTION

The insertion of a radio or other multimedia instrument, such as a navigation device, into an instrument panel of an automotive vehicle is usually performed manually, in which case it usually requires a bracket attached to both of the opposite sides of the instrument to assist in the insertion of the instrument. Each such bracket typically has an outwardly projecting flange at its leading edge for purposes of imparting rigidity to the bracket. Unfortunately, the available clearance between the opening into which the instrument is to be inserted and the outer extent of the flange of the bracket that is attached to the instrument is quite small, and this problem can result in a delay in the instrument insertion operation.

Another problem previously encountered in manually inserting a radio or other multimedia instrument into an instrument panel of an automotive vehicle is the problem of suspending the instrument, which can often weigh as much as 3.5 kg in the case of a radio, while wiring harness connections are made to the back of the instrument. In addition to a possible problem of worker fatigue arising from the fact that the worker tends to hold the instrument in a single hand while using the other hand to insert the wiring connection, inherently there is some variation in the position of the instrument from unit to unit while the wiring connection is made, which can also result in a delay in the instrument insertion operation.

BRIEF DESCRIPTION OF THE INVENTION

According to the present invention, a bracket is provided for attachment to a multimedia instrument the bracket having a reduced lateral extent leading edge to facilitate the insertion of the instrument into an opening of an automotive vehicle instrument panel. The bracket is reinforced for purposes of rigidity by an externally projecting rib that is spaced inwardly from the leading edge of the bracket, and this makes it easier for the worker manually inserting the instrument into the opening to find the opening, inasmuch as the instrument is already partly inserted in the opening before the rib is positioned to enter the opening. Further, the rib, which is U-shaped in cross section, has a smooth outer surface, which makes it far less likely to hang up as it enters the opening than the outer edge of the flange of the prior art bracket, which typically has a sharp edge. Further, the U-shaped rib, because of its dual thickness, adds rigidity to the bracket over that provided by a single thickness flange in a leading edge of the bracket with very little increase in the weight of the bracket.

A bracket according to the present invention, as heretofore described, or a prior art bracket as heretofore described, may also be provided with an in-turned tab that extends from an in-turned flange that has mounting holes for connecting the bracket to a front of the instrument to which the bracket is to be assembled. The tab is adapted for insertion into an opening of the instrument in which the bracket is assembled, and especially with the aid of a like bracket attached to an opposite side of the instrument, serves both to support the weight of the instrument during the attachment of wiring elements to the back side of the instrument, to prevent fatigue to assembly workers, but also to stabilize the position of the instrument during such attachment to help reduce the lost assembly time that may occur during such attachment as a result of motion of the instrument at that time.

BRIEF DESCRIPTION OF THE DRAWINGS

For a further understanding of the present invention, attention is directed to the drawing and the following brief description thereof.

DETAILED DESCRIPTION OF THE INVENTION

Prior Art

Figure 1:
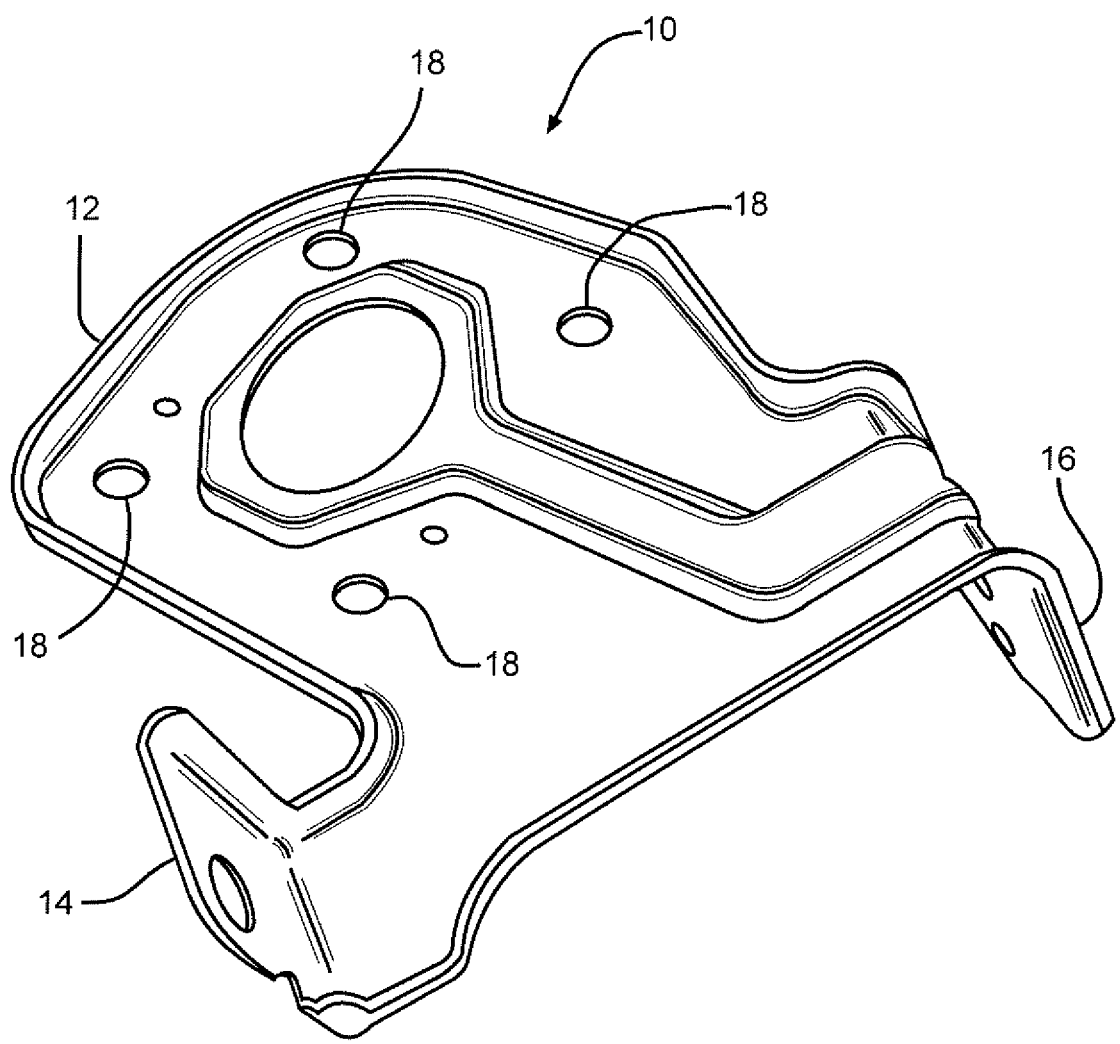
FIG. 1 is a perspective view of a prior art bracket for attachment to a side of a radio or other multimedia instrument prior to insertion of the instrument into an opening in an instrument panel of an automotive vehicle.
Figure 2:
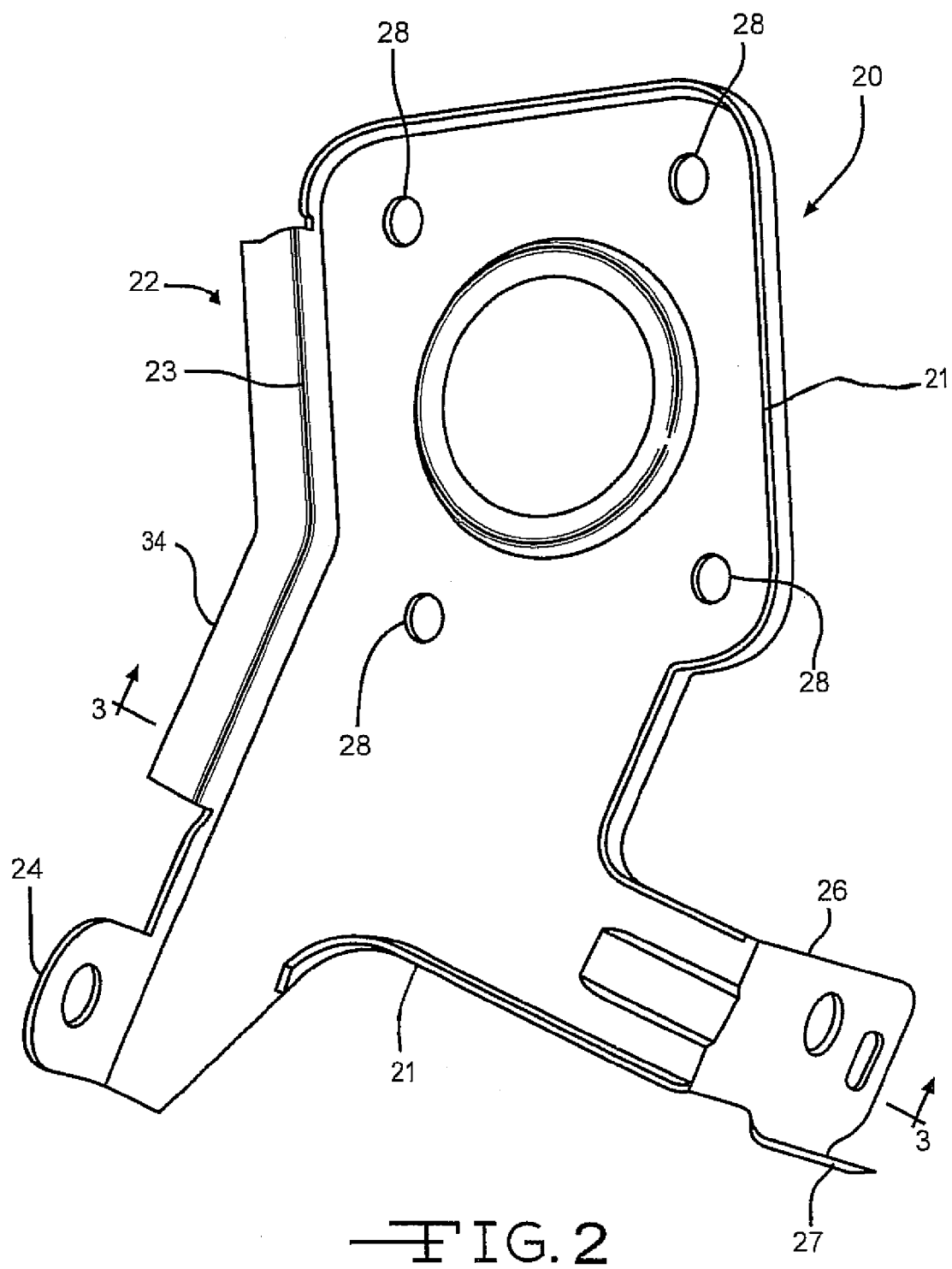
FIG. 2 is a perspective view of a bracket according to the present invention for attachment to a side of a radio or other multimedia instrument prior to insertion of the instrument into an opening of an instrument panel.
Figure 3:
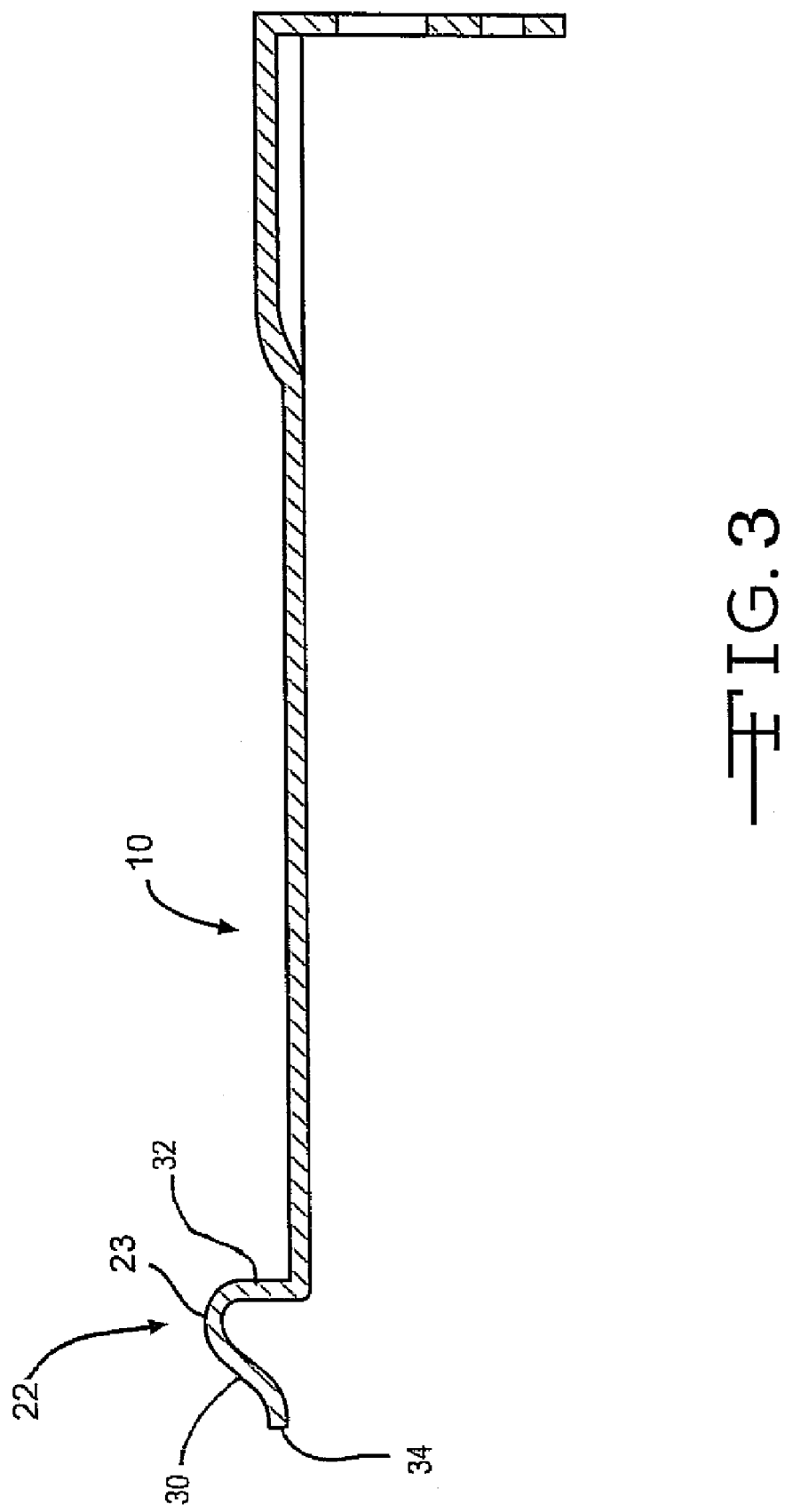
FIG. 3 is a sectional view taken on line 3-3 of FIG. 2.

FIG. 1 illustrates a prior art bracket that is generally stamped of a metallic material, such as steel, for attachment to a radio or other multimedia instrument (not shown) to facilitate the assembly of the instrument into an opening in an instrument panel of an automotive vehicle. The bracket 10 has a leading edge 12, that is, the edge that leads when the instrument is inserted into the instrument panel opening, and the leading edge 12 is configured with an outwardly projecting flange the purpose of which is to add rigidity to the bracket 10. Unfortunately, the flange of the leading edge 12, which has a free edge that may be somewhat rough, tends to hang up or interfere with the insertion of the associated multimedia instrument into an automotive instrument panel inasmuch as the available space is often quite limited in this region. The bracket 10 also has an inwardly turned flange 14 that is positioned away from the leading edge 12; the flange 14 permits the bracket 10 to be bolted or otherwise secured to a rear surface of the instrument. The bracket 10 also has and an outwardly turned flange 16, by which the bracket is bolted or otherwise secured to the front surface of the instrument, as well as openings 18 that permit the bracket 10 to be bolted or otherwise secured to a side of the instrument. It is to be understood that each multimedia instrument has a similar bracket attached to its opposed side, the only difference between the spaced, opposed brackets is that one is a left-hand version and the other is a right-hand version.

During preparation of the instrument for manual insertion into an opening in an instrument panel of the vehicle, the instrument is held in one hand by an assembly worker while the other hand of the worker is connecting wiring elements to the instrument at the rear thereof. This requirement permits the assembly worker to become fatigued, and it also permits the instrument to move somewhat during attachment of the wiring elements, which complicates the wiring connection procedure and can delay completion of the insertion task.

Present Invention

Figure 4:
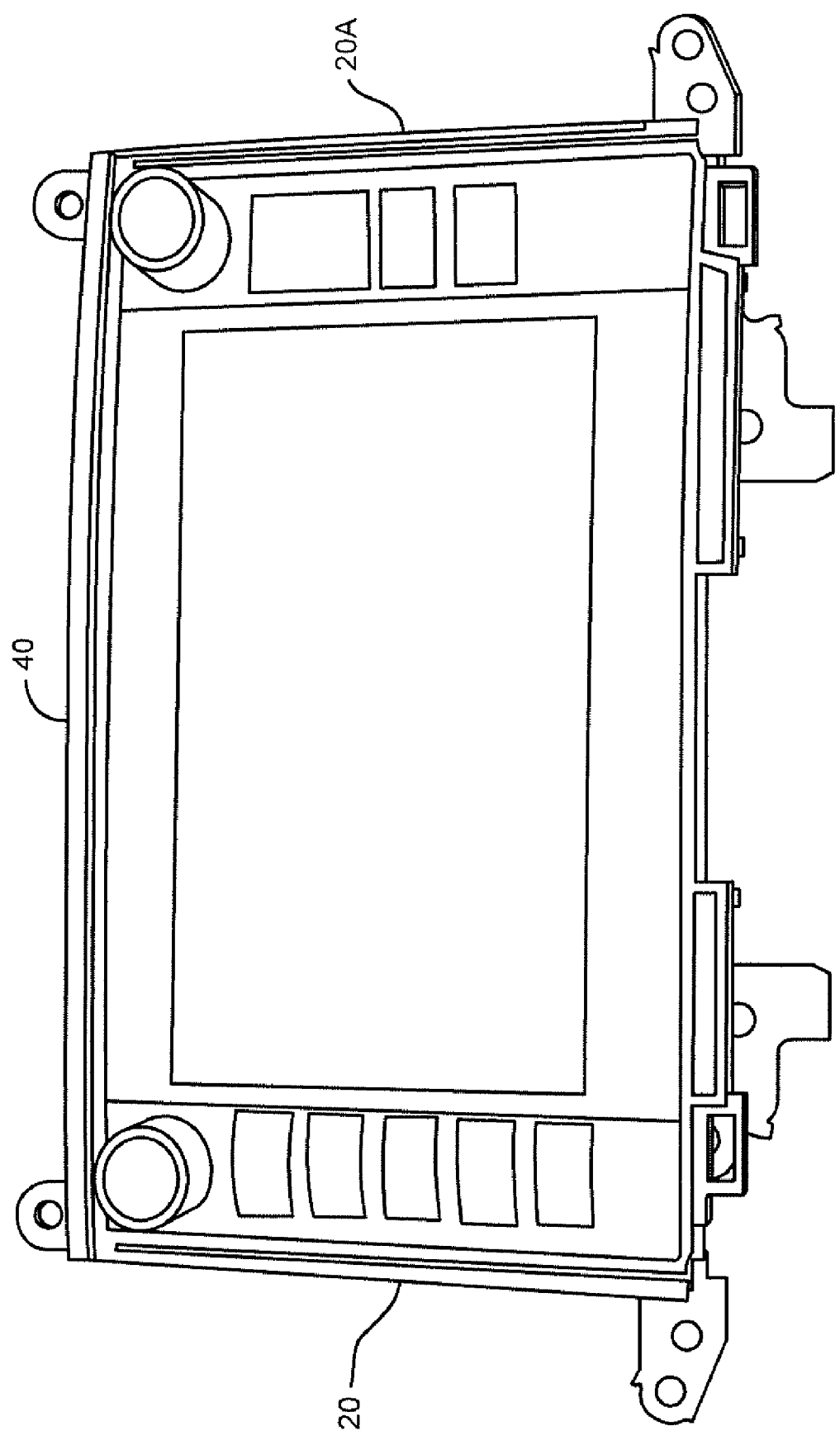
FIG. 4 is an elevation view of a multimedia instrument with opposed brackets according to the present invention attached to opposite sides of the instrument.

A bracket according to the present invention is generally identified by reference numeral 20. The bracket 20, like the bracket 10, is stamped from steel and is intended to be attached to a side of a radio or other multimedia instrument, which is identified by reference numeral 40 in FIG. 4, and an opposed bracket 20A is attached to an opposed side of the instrument 40. The bracket 20A is like the bracket 20, except that it is an opposite hand version thereof.

The bracket 20 includes a wall 21 and a leading edge 22. The wall extends in a direction generally normal from the bracket 20, and bounds a portion of the perimeter of the bracket 20. The leading edge 22, unlike the leading edge 12 of the bracket 10, does not have an outwardly projecting flange. Rather, the leading edge 22 of the bracket 20 is reinforced by an inwardly situated and outwardly projecting curved rib portion 23 to add rigidity to the bracket 20. The curved rib portion 23 extends between a free end portion 30 and a planar portion 32 to form a generally U-shape. The free end portion 30 is adjacent the free end 34 of the leading edge, and extends in a plane that is generally planar to the bracket 20. The planar portion 32 is adjacent the bracket 20 and extends in the same direction as the wall 21. By locating the curved rib portion 23 inwardly from the free or distal end of the leading edge 22, an instrument 40 with the bracket 20 attached is more easily inserted into an opening in an instrument panel of an automotive vehicle, not only because of the absence of an outwardly projecting flange at the free or distal end of the leading edge, but also by virtue of the smooth outer surface of the curved rib portion 23.

Like the bracket 10, the bracket 20 is also provided with openings 28, corresponding to the openings 18 of the bracket 10, by which the bracket 20 may be bolted or otherwise secured to an instrument, such as the instrument 40; the bracket 20 is also provided with a flange 24 by which the bracket 20 is bolted or otherwise secured to a surface of an instrument 40; and the bracket 20 is also provided with a flange 26 on which the bracket 20 is bolted or otherwise secured to a surface of the instrument 40. The flange 26 differs from the flange 16 of the bracket 10 in that the flange 26 is provided with an in-turned tab 27 that is adapted to be inserted into an opening in an instrument 40, by which the instrument 40 may be suspended and accurately positioned during connection of wiring elements to the instrument 40, thus eliminating the need for an assembly worker to hold the instrument 40 in a suitable position during the connection of the wiring elements.

The best mode known to the inventor(s) for carrying out the present invention as of the filing date hereof has been shown and described herein, but it will be apparent to those skilled in the art that suitable modifications, variations and equivalents may be made without departing from the scope of the invention, such scope being limited solely by the terms of the following claims and the legal equivalents thereof.

The invention claimed is:

1. An assembly comprising:
a multimedia instrument having an opposed pair of sides, the instrument adapted to be inserted into an opening of an instrument panel of an automotive vehicle; and
a bracket having a generally planar member attached to one of the opposed pair of sides of the multimedia instrument, said generally planar member having a wall and a leading edge, said leading edge adapted to be inserted into the opening to facilitate insertion of the instrument into the opening and to provide rigidity to said bracket;
wherein said wall extends in a direction generally normally from said planar member and bounds a portion of said planar member, and wherein said leading edge includes a curved portion extending between a free end portion and a planar portion to form a generally U-shape having a smooth outer edge, said free end portion extends in a plane generally parallel to said planar member, and said planar portion extends in the same direction as said wall.

2. The assembly according to claim 1 wherein: said generally planar member is stamped from a metallic material.

3. The assembly according to claim 2 wherein: said metallic material is steel.

4. The assembly according to claim 1, wherein said bracket further includes an in-turned flange extending from said generally planar member at a location away from said leading edge; and
a tab extending normally from an end of said in-turned flange for engaging the multimedia instrument to support and position the multimedia instrument during insertion of the instrument panel into the opening of an instrument panel of an automotive vehicle.

5. The assembly according to claim 4 wherein: said generally planar member is stamped from a metallic material.

6. The assembly according to claim 5 wherein: said metallic material is steel.

* * * * *